United States Patent
Liu

(10) Patent No.: US 8,320,223 B2
(45) Date of Patent: Nov. 27, 2012

(54) OPTICAL STORAGE APPARATUS AND METHOD FOR ELIMINATING WRITE POWER TRANSIENT THEREOF

(75) Inventor: Yao-Wen Liu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 393 days.

(21) Appl. No.: 12/430,852

(22) Filed: Apr. 27, 2009

(65) Prior Publication Data

US 2010/0182882 A1 Jul. 22, 2010

(30) Foreign Application Priority Data

Jan. 22, 2009 (TW) .............................. 98102574 A

(51) Int. Cl.
*G11B 11/00* (2006.01)
(52) U.S. Cl. ................. 369/47.5; 369/53.26; 369/53.27; 369/47.53; 369/116
(58) Field of Classification Search .................. 369/47.5, 369/47.51, 59.15
See application file for complete search history.

(56) References Cited

U.S. PATENT DOCUMENTS

| 2004/0136299 | A1* | 7/2004 | Han ............................ 369/53.26 |
| 2005/0117473 | A1 | 6/2005 | Ke et al. |
| 2005/0270939 | A1* | 12/2005 | Kashihara et al. ......... 369/47.53 |
| 2007/0217299 | A1* | 9/2007 | Wang et al. .................... 369/43 |

FOREIGN PATENT DOCUMENTS

CN 1612240 5/2005

OTHER PUBLICATIONS

"Office Action of China Counterpart Application", issued on Jun. 11, 2010, p. 1-p. 4.

* cited by examiner

*Primary Examiner* — Adam R Giesy
(74) *Attorney, Agent, or Firm* — Jianq Chyun IP Office

(57) ABSTRACT

An optical storage apparatus and a method for eliminating a write power transient thereof are provided. The method includes following steps. First, a target voltage level of a write voltage when next time the optical storage apparatus writes data is obtained. Then, a command value is updated by using the target voltage level according to a relationship between the command value and the write voltage. Next, the write voltage of the optical storage apparatus is pre-charged to the target voltage level according to the updated command value. Thereby, the write power transient of the optical storage apparatus can be eliminated.

17 Claims, 6 Drawing Sheets

OPTICAL STORAGE APPARATUS AND METHOD FOR ELIMINATING WRITE POWER TRANSIENT THEREOF

CROSS-REFERENCE TO RELATED APPLICATION

This application claims the priority benefit of Taiwan application serial no. 98102574, filed on Jan. 22, 2009. The entirety of the above-mentioned patent application is hereby incorporated by reference herein and made a part of specification.

BACKGROUND OF THE INVENTION

1. Field of the Invention

The present invention generally relates to an optical storage apparatus, and more particularly, to a method for eliminating a write power transient of an optical storage apparatus.

2. Description of Related Art

An optical storage apparatus uses a laser beam emitted by an optical pickup as the medium for reading and writing data. In an optical storage apparatus, a low pass filter (LPF) is usually adopted for filtering out noises produced by the circuit, such that the power of the laser beam can be maintained at a stable level and accordingly the optical pickup can write or read data correctly. Generally speaking, a LPF composed of resistors and capacitors has a constant RC value. Accordingly, when the optical storage apparatus starts to write data, a constant transient time is required for the write voltage to transform from its initial voltage level (for example, the ground level) to a target voltage level.

Thereby, when an optical storage apparatus writes data, the quality of data written during this transient time is not so satisfactory since the write voltage has not reached the target voltage level during that period. If the optical storage apparatus has a low writing speed, not much data is written during the transient time and accordingly the affection of the transient time can be ignored. However, along with the increase of data writing speed, the quantity of data written during the transient time is gradually increased, and accordingly the affection of the transient time becomes more serious. As a result, the writing quality of the optical storage apparatus will be greatly reduced. Since all the existing optical storage apparatuses have high writing speeds, how to eliminate the affection of transient time has become one of the major subjects in the industry.

SUMMARY OF THE INVENTION

Accordingly, the present invention is directed to a method for eliminating a write power transient of an optical storage apparatus, wherein a write voltage is pre-charged to a target voltage level before the optical storage apparatus starts to write data.

The present invention is directed to an optical storage apparatus, wherein a write power transient of the optical storage apparatus is eliminated.

The present invention provides a method for eliminating a write power transient of an optical storage apparatus. The method includes following steps. First, a target voltage level of a write voltage (VWDC) when next time the optical storage apparatus writes data is obtained. Then, a command value (DAC) is updated by using the target voltage level according to a relationship between the command value and the write voltage. Next, the write voltage of the optical storage apparatus is pre-charged to the target voltage level according to the updated command value before the optical storage apparatus starts to write data.

The present invention also provides an optical storage apparatus including an optical power unit and a power control unit. The optical power unit receives a write voltage, transforms the write voltage into a light beam, and emits the light beam to write an optical disc. The power control unit is coupled to the optical power unit, and which detects a writing status of the optical power unit to the optical disc and receives a first command value and a second command value. When the optical storage apparatus is in a writing state, the power control unit generates the write voltage according to the first command value and foregoing detection result. When the optical storage apparatus is in a before-writing state, the optical storage apparatus generates the write voltage according to the second command value. The second command value is updated according to a target voltage level of the write voltage when next time the optical storage apparatus writes data and a relationship between the first or the second command value and the write voltage, so that the write voltage can be pre-charged to the target voltage level before the optical storage apparatus starts to write data.

As described above, the present invention provides an optical storage apparatus and a method for eliminating a write power transient of the optical storage apparatus, wherein a target voltage level of a write voltage when next time the optical storage apparatus writes data is obtained, and a command value is updated according to the target voltage level, so that the write voltage can be pre-charged to the target voltage level before the optical storage apparatus starts to write data. Thereby, the write power transient when the optical storage apparatus just starts to write data can be eliminated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
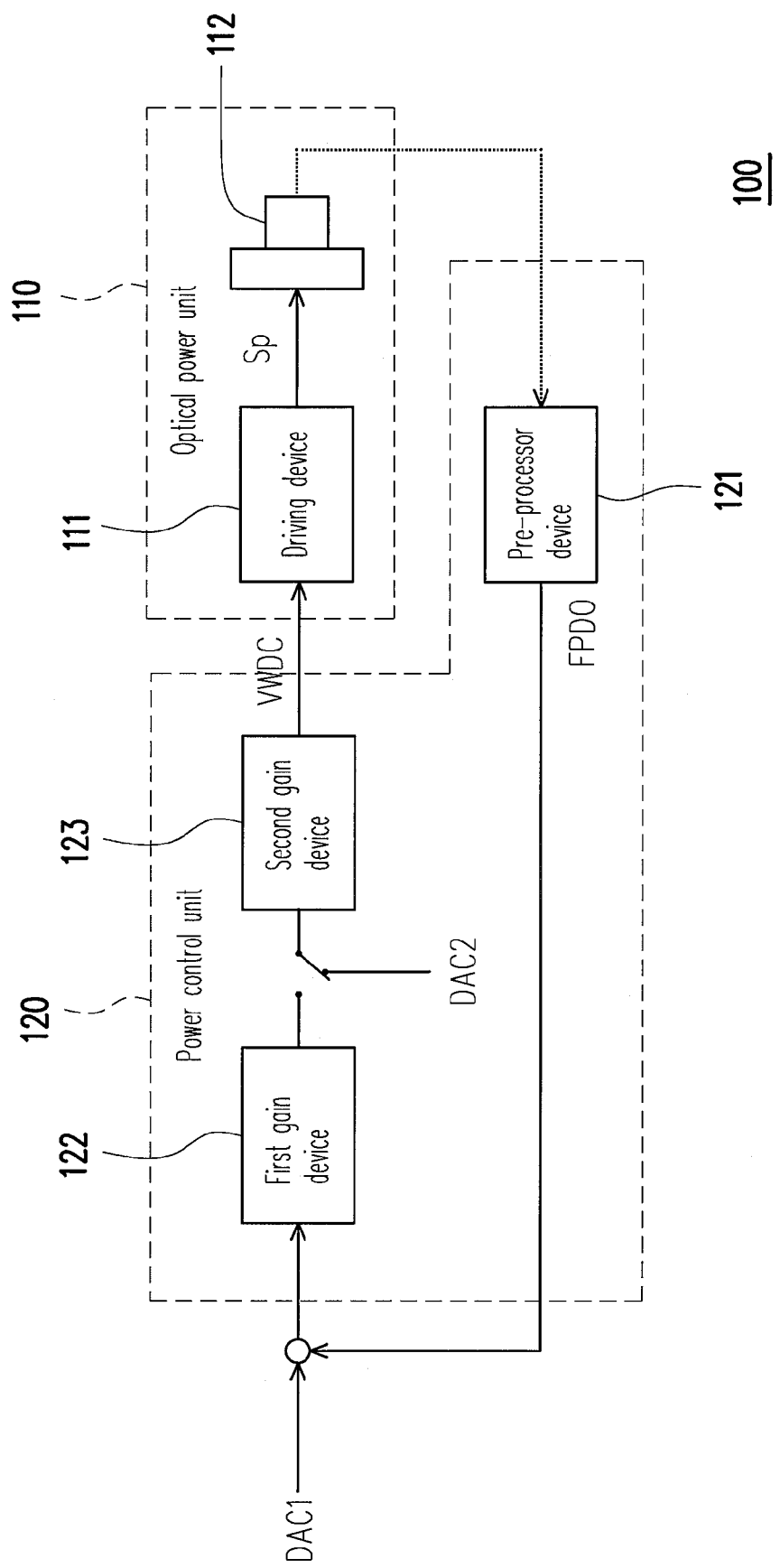
FIG. 1A is a system block diagram of an optical storage apparatus according to the present invention.

Reference will now be made in detail to the present preferred embodiments of the invention, examples of which are illustrated in the accompanying drawings. Wherever possible, the same reference numbers are used in the drawings and the description to refer to the same or like parts.

Since all of the existing optical storage apparatuses have high data writing speed, the transient time of write voltage will affect the quality of data writing. Thereby, the present invention provides an optical storage apparatus and a method for eliminating a write power transient thereof, wherein the optical storage apparatus may be an optical disc drive or a disc player (for example, a DVD/VCD player) which uses an optical disc as its storage medium. Below, embodiments of the present invention will be described in detail with reference to accompanying drawings.

FIG. 1A is a system block diagram of an optical storage apparatus according to the present invention. Referring to FIG. 1, the optical storage apparatus 100 includes an optical power unit 110 and a power control unit 120. The optical power unit 110 receives a write voltage VWDC, transforms the write voltage VWDC into a light beam, and emits the light beam to write an optical disc, wherein the light beam may be a laser beam. The power control unit 120 is coupled to the optical power unit 110 for detecting a writing status of the optical power unit 110 to the optical disk, and the power control unit 120 receives a first command value DAC1 and a second command value DAC2. The power control unit 120 generates the write voltage VWDC by using the first command value DAC1 and the detection result or by using the second command value DAC2 according to whether the optical storage apparatus 100 is in a writing state or not.

Generally speaking, the optical storage apparatus 100 is in a hold mode before it starts to write data, and the optical storage apparatus 100 switches to an automatic power control (APC) mode when it writes data. In the hold mode, the power control unit 120 receives the second command value DAC2, wherein the second command value DAC2 is usually a fixed value. In this case, the power control unit 120 provides the write voltage VWDC at a fixed voltage level. Additionally, because data is written into the optical disc by using a laser beam, the temperature of the optical disc will be increased when data is written therein. As a result of the temperature increase, the power of the laser beam emitted by the optical power unit 110 is reduced, and in this case, the write voltage VWDC has to be increased in order to stabilize the power of the laser beam. Thus, in the APC mode, the writing status of the optical power unit 110 to the optical disc is detected to monitor the power variation of the laser beam, and the write voltage is generated according to foregoing detection result and the first command value DAC1, so that the write voltage VWDC can be adjusted according to the variation in the temperature.

As described above, when data is written (in the APC mode) into the optical disc, the voltage level (herein the current voltage level of the write voltage VWDC is represented with a target voltage level) of the write voltage VWDC varies along with the temperature, so that when the optical storage apparatus 100 switches from the hold mode to the APC mode, it produces a voltage switch transient, wherein the target voltage level is the optimal write voltage level for writing data. The optical storage apparatus 100 can reduce or eliminate the voltage switch transient of the write voltage VWDC by adjusting the voltage level of the write voltage VWDC before writing data (in the hold mode) to the target voltage level. Thereby, the second command value DAC2 is updated according to the target voltage level of the write voltage VWDC when next time the optical storage apparatus 100 writes data so that the write voltage VWDC can be pre-charged to the target voltage level before the optical storage apparatus 100 starts to write data.

Figure 1B:
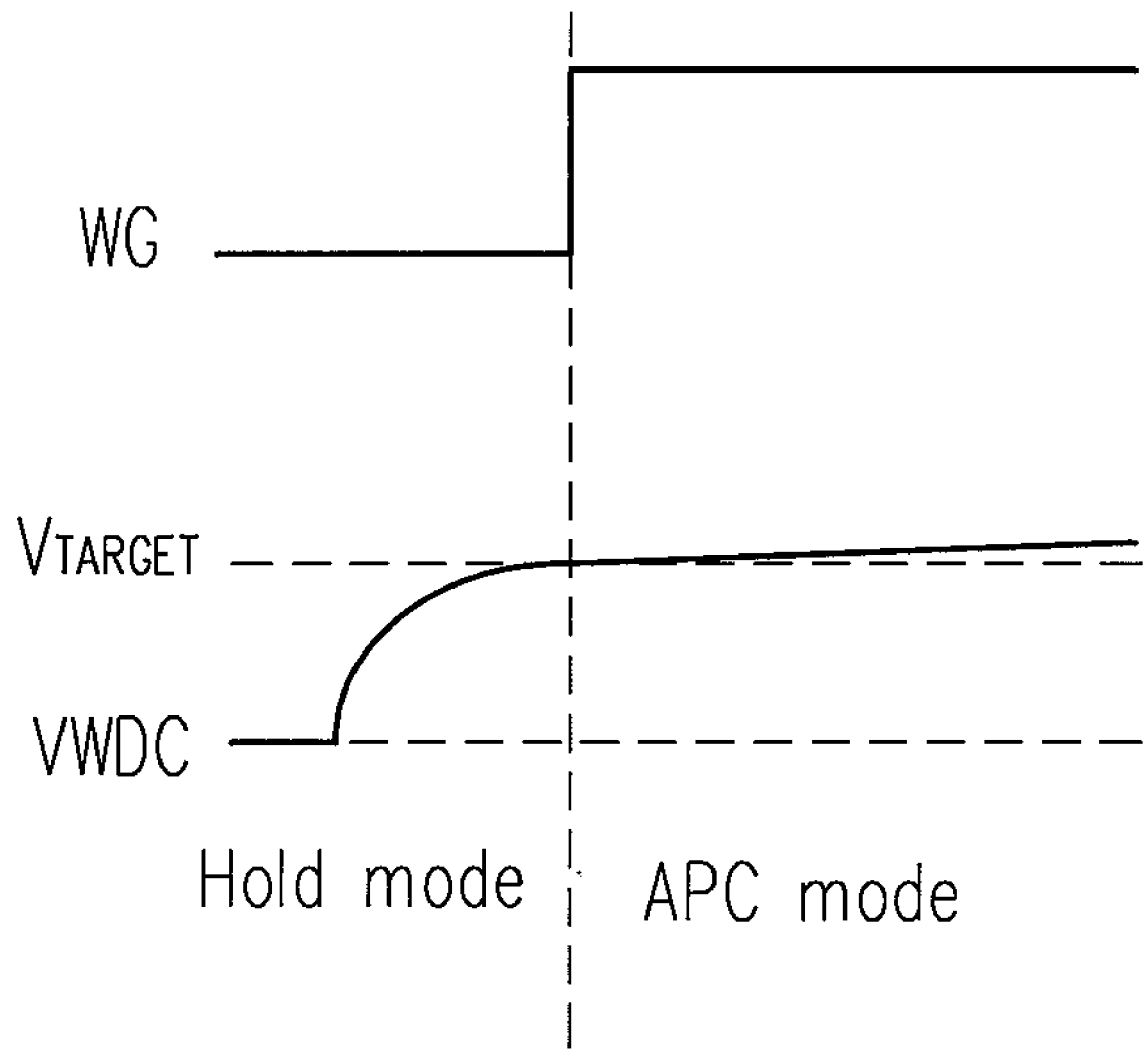
FIG. 1B is a waveform of an optical storage apparatus according to the present invention.

FIG. 1B is a waveform of an optical storage apparatus according to the present invention. Referring to FIG. 1B, the write gate signal WG represents whether the optical storage apparatus 100 is in a writing state or not. When the write gate signal WG is at a high voltage level, the optical storage apparatus 100 is in the writing state, and when the write gate signal WG is at a low voltage level, the optical storage apparatus 100 is not in the writing state, wherein the voltage level of the write gate signal WG is only used as an example but not intended for limiting the scope of the present embodiment.

Before the optical storage apparatus 100 starts to write data (i.e., when the write gate signal WG is at the low voltage level), the optical storage apparatus 100 is in the hold mode and pre-charges the write voltage VWDC to the target voltage level $V_{TARGET}$. When the optical storage apparatus 100 writes data (i.e., when the write gate signal WG is at the high voltage level), the optical storage apparatus 100 switches to the APC mode so that the write voltage VWDC thereof can be smoothly charged. As a result, the optical storage apparatus 100 can writes data to the optical disc by using the target voltage level $V_{TARGET}$ directly. Thereby, when the optical storage apparatus 100 switches from the hold mode to the APC mode, the transient time of the write voltage VWDC is greatly shortened or even eliminated, and accordingly the affection of the write power transient is reduced or disappears.

To be specific, the optical power unit 110 includes a driving device 111 and an optical pickup 112, wherein the optical pickup 112 may be an optical pickup. The driving device 111 is coupled to the power control unit 120 for transforming the write voltage VWDC into a power signal $S_P$. The optical pickup 112 is coupled to the driving device 111 for transforming the power signal $S_P$ into a laser beam and emitting the laser beam.

The power control unit 120 includes a pre-processor device 121, a first gain device 122, and a second gain device 123, wherein the pre-processor device 121 may be a photo diode. The pre-processor device 121 detects a writing status of the optical power unit 110 to the optical disc and outputs a parameter value FPDO corresponding to the writing status to feedback the current write power. The first gain device 122 receives the first command value DAC1 and the parameter value FPDO and generates an output signal according to the parameter value FPDO and the first command value DAC1. The second gain device 123 selectively couples to the first gain device 122 or receives the second command value DAC2 according to whether the optical storage apparatus 100 is in the writing state or not, so as to generate the write voltage VWDC according to the output signal of the first gain device 122 or the second command value DAC2.

For example, when the optical storage apparatus 100 is in the hold mode, the second gain device 123 receives the second command value DAC2 and generates the write voltage VWDC according to the second command value DAC2. Meanwhile, the second command value DAC2 is updated according to the target voltage level of the write voltage VWDC. When the optical storage apparatus 100 switches to the APC mode, the second gain device 123 couples to the first gain device 122 and generates the write voltage VWDC according to the output signal of the first gain device 122. In this case, because the write voltage VWDC is pre-charged to the target voltage level before the optical storage apparatus 100 starts to write data, no transient is produced, and the second gain device 123 can be integrated with a low pass filter (LPF) to stabilize the write voltage VWDC.

A method for eliminating a write power transient of the optical storage apparatus 100 is also provided in the present embodiment.

First Embodiment

Figure 2:
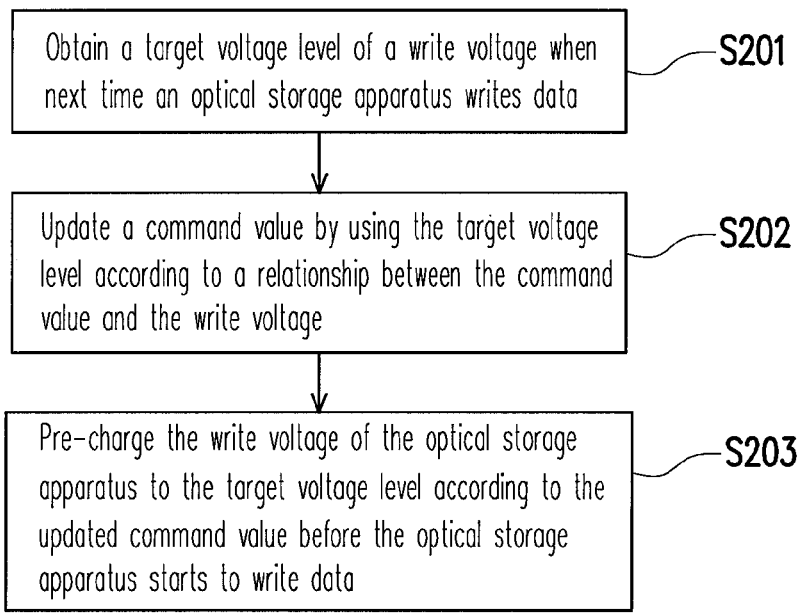
FIG. 2 is a flowchart of a method for eliminating a write power transient of an optical storage apparatus according to a first embodiment of the present invention.

FIG. 2 is a flowchart of a method for eliminating a write power transient of an optical storage apparatus according to the first embodiment of the present invention. Referring to FIG. 2, in the present embodiment, first, in step 201, a target voltage level of the write voltage when next time the optical storage apparatus writes data is detected. Then, in step S202, a command value is updated by using the target voltage level according to a relationship between a first or a second command value and the write voltage, wherein the command value may be the second command value DAC2 in the optical storage apparatus 100. Next, in step S203, the write voltage of the optical storage apparatus is pre-charged to the target voltage level according to the updated second command value before the optical storage apparatus starts to write data. The relationship between the first or the second command value and the write voltage may be a ratio of the current voltage level of the write voltage to the first or the second command value when the optical storage apparatus performs an offline test or every time when the optical storage apparatus is powered on and performs a self correction. For example, before the optical storage apparatus starts to write data (i.e., when it is in the hold mode), the target voltage level (for example, 1.8V) of the write voltage when the optical storage apparatus writes data (i.e., the optical storage apparatus switches to the APC mode) can be estimated according to the variation of temperature or other parameter (for example, a read voltage VRDC) which varies along with the temperature. Then, the command value (for example, 600) is updated by using a ratio between the command value and the write voltage (for example, 1:3 mV). Thus, the optical storage apparatus pre-charges the write voltage to the target voltage level (for example, about 1.8V) according to the new command value (for example, 600) so that when the optical storage apparatus switches to the APC mode, the write voltage thereof can be smoothly charged without producing any transient. FIG. 1B illustrates the waveform of the optical storage apparatus and which will not be described herein.

Generally speaking, because the write power changes along with the temperature, before the optical storage apparatus starts to write data, an optimal power calibration (OPC) is performed to adjust the relationship between the write power and the command value based on the current temperature and obtain the target voltage level according to an obtained optimal power. This process will be described below with reference to another embodiment of the present invention.

Second Embodiment

Figure 3:
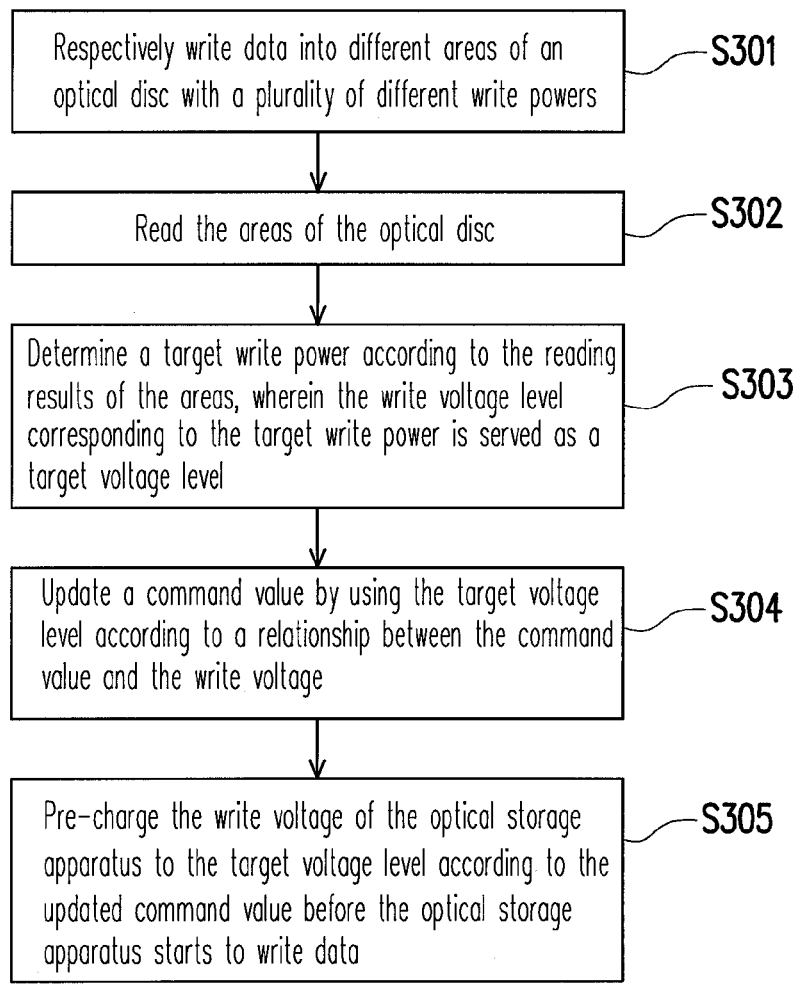
FIG. 3 is a flowchart of a method for eliminating a write power transient of an optical storage apparatus according to a second embodiment of the present invention.

FIG. 3 is a flowchart of a method for eliminating a write power transient of an optical storage apparatus according to the second embodiment of the present invention. First, in step S301, data is respectively written into a specific area of an optical disc with a plurality of different write powers. Then, in step S302, the specific area of the optical disc is read, wherein the specific area may be a power calibration area (PCA). After that, in step S303, a target write power is determined according to foregoing reading result, and the write voltage corresponding to the target write power is served as the target voltage level. Next, in step S304, a command value is updated by using the target voltage level according to the relationship between the command value and the write voltage. Thereafter, in step S305, the write voltage of the optical storage apparatus is pre-charged to the target voltage level according to the updated command value before the optical storage apparatus starts to write data, wherein the target write power may be the write power corresponding to the area having the optimal writing quality.

For example, the optical storage apparatus first performs an OPC by writing data respectively into a specific area of the optical disc with a plurality of different write powers and recording the write voltages corresponding to these write powers. Then, the specific area is read, and the optimal area (i.e., the one having the optimal writing quality) is selected according to the obtained read signals, wherein the optimal read signal is a suitable value (for example, 4%). Then, the write power corresponding to the area having the optimal writing quality is defined as a target power, and the write voltage corresponding to the target power is served as a target voltage (for example, 1.8V). Next, similarly, the command value (for example, updated to 600) is updated by using the ratio of the command value to the write voltage (for example, 1:3 mV). The optical storage apparatus then pre-charges the write voltage to the target voltage level (for example, 1.8V) according to the new command value (for example, 600). Thus, the optimal command value is obtained when the optical storage apparatus performs the OPC, so that the current temperature can be reflected instantly without costing any extra time. Thereby, the method is accurate and cuts the preparation time for writing data.

In some cases (for example, when buffer data is insufficient or at a specific system instruction), the optical storage apparatus performs a writing termination (to terminate the data writing) before it finishes writing data. How to eliminate the write power transient in this case will be described below with reference to another embodiment of the present invention.

Third Embodiment

Figure 4A:
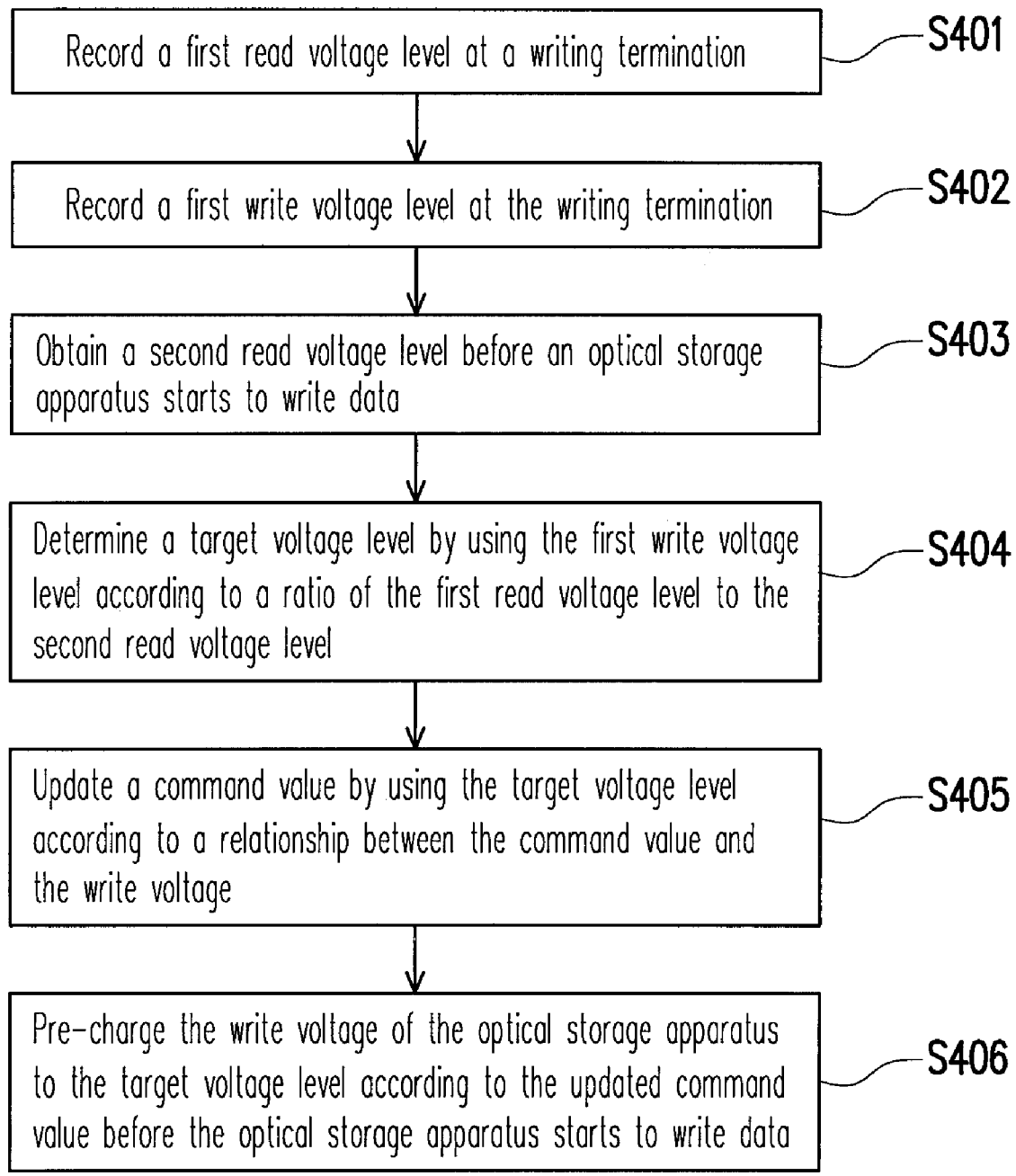
FIG. 4A is a flowchart of a method for eliminating a write power transient of an optical storage apparatus according to a third embodiment of the present invention.

FIG. 4A is a flowchart of a method for eliminating a write power transient of an optical storage apparatus according to the third embodiment of the present invention. Referring to FIG. 4A, in the present embodiment, first, in step S401, a first read voltage level at a writing termination is recorded. Then, in step S402, a first write voltage level at the writing termination is recorded. Next, in step S403, a second read voltage level before the optical storage apparatus starts to write data is obtained. After that, in step S404, a target voltage level is determined by using the first write voltage level according to the ratio of the first read voltage level to the second read voltage level. Next, in step S405, a command value is updated by using the target voltage level according to the relationship between the command value and the write voltage. Thereafter, in step S406, the write voltage of optical storage apparatus is pre-charged to the target voltage level according to the updated command value before the optical storage apparatus starts to write data. The writing termination is the last writing termination before the optical storage apparatus starts to write data, and the writing termination may be caused by insufficient buffer data or a system instruction.

For example, when the optical storage apparatus writes data, it constantly monitors the read voltage level, temperature, and write voltage level thereof. Assuming that a writing termination of the optical storage apparatus is caused by insufficient buffer data, the optical storage apparatus records both the current first read voltage level (for example, 1V) and the current first write voltage level (for example, 1.5V) at the writing termination. When the optical storage apparatus writes data again, it obtains a current second read voltage level (for example, 0.9V) and determines the target voltage level (for example, 1.35V) by using the first write voltage level (for example, 1.5V) according to the ratio of the first read voltage level to the second read voltage level (1/0.9). Next, the command value (for example, 450) is updated according to the ratio of the command value to the write voltage. The optical storage apparatus then pre-charges the write voltage thereof to the target voltage level (for example, 1.35V) according to the updated command value (for example, 450), so as to eliminate the transient.

Figure 4B:
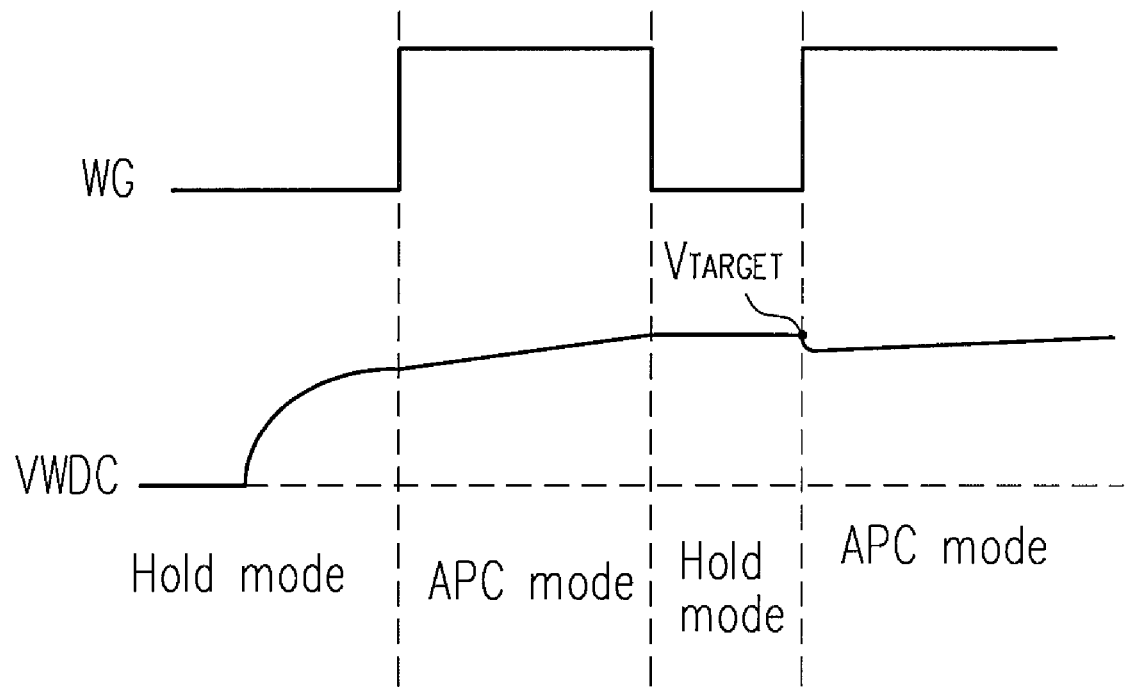
FIG. 4B is a waveform of an optical storage apparatus according to the present invention.

It should be mentioned that if the writing termination is caused by insufficient buffer data, the writing termination can be expected to be very short, and the temperature change is relatively small. Thus, the first write voltage level can be served as the target voltage level, and the waveform thereof is illustrated in FIG. 4B. Referring to FIG. 4B, the optical storage apparatus switches from the APC mode back to the hold mode at the writing termination, and in this case, the first write voltage level of the optical storage apparatus at the writing termination is served as the target voltage level $V_{TARGET}$. When the optical storage apparatus starts to write data again, the optical storage apparatus switches to the APC mode again, and the write voltage is transformed from the target voltage level $V_{TARGET}$ to the actual write voltage level. As shown in FIG. 4B, is transient produced is very short therefore will not affect the writing of the optical storage apparatus.

If the writing termination is caused by a system instruction, then the duration of the writing termination cannot be expected. Thus, before the optical storage apparatus starts to write data again, the target voltage level thereof is estimated again to pre-charge the write voltage to the target voltage level.

In another embodiment of the present invention, the target voltage level is determined according to the ratio between the temperature at the writing termination and the temperature before the optical storage apparatus starts to write data again. Namely, in step S401, only the first temperature at the writing termination is recorded, and in step S403, only the second temperature before the optical storage apparatus starts to write data is obtained, and in step S404, the target voltage level is determined by using the first write voltage level according to the ratio of the first temperature to the second temperature. In addition, the ratios of the temperatures and the read voltage levels can be weighted, and the target voltage level can be determined according to the weighted ratios. For example, the target voltage level=((M1/(M1+M2))×(second temperature/first temperature)+(M2/(M1+M2))×(second read voltage level/first read voltage level))×first write voltage level, wherein M1 and M2 are the weights and M1+M2=1. Accordingly, when the optical storage apparatus starts to write data after the writing termination, it can determine the current command value by comparing the previously-recorded write voltage, read voltage, and temperature with the currently read voltages and temperature without performing the OPC or other measurements again.

An offline test is usually performed after the optical storage apparatus is manufactured to measure the relationship between the command value and the write power, the relationship between the command value and the write voltage, and the read voltage level in the optical storage apparatus under the current temperature in respectively the hold mode and the APC mode. Because the read voltage also increases along with the temperature, the read voltage level during the offline test and the read voltage level before the optical storage apparatus starts to write data can be compared to reflect the variation of the temperature and adjust the command value to a suitable value, so that when the optical storage apparatus switches from the hold mode to the APC mode, the target voltage level or burning power can be maintained at the same value. The variation of the relationship between the command value and the write voltage relative to the temperature is far smaller than that of the relationship between the command value and the write power relative to the temperature. Thus, in the optical storage apparatus, the relationship between the command value and the write voltage will not be affected by the temperature, and accordingly the command value and the write voltage can be considered very accurate.

Fourth Embodiment

Figure 5:
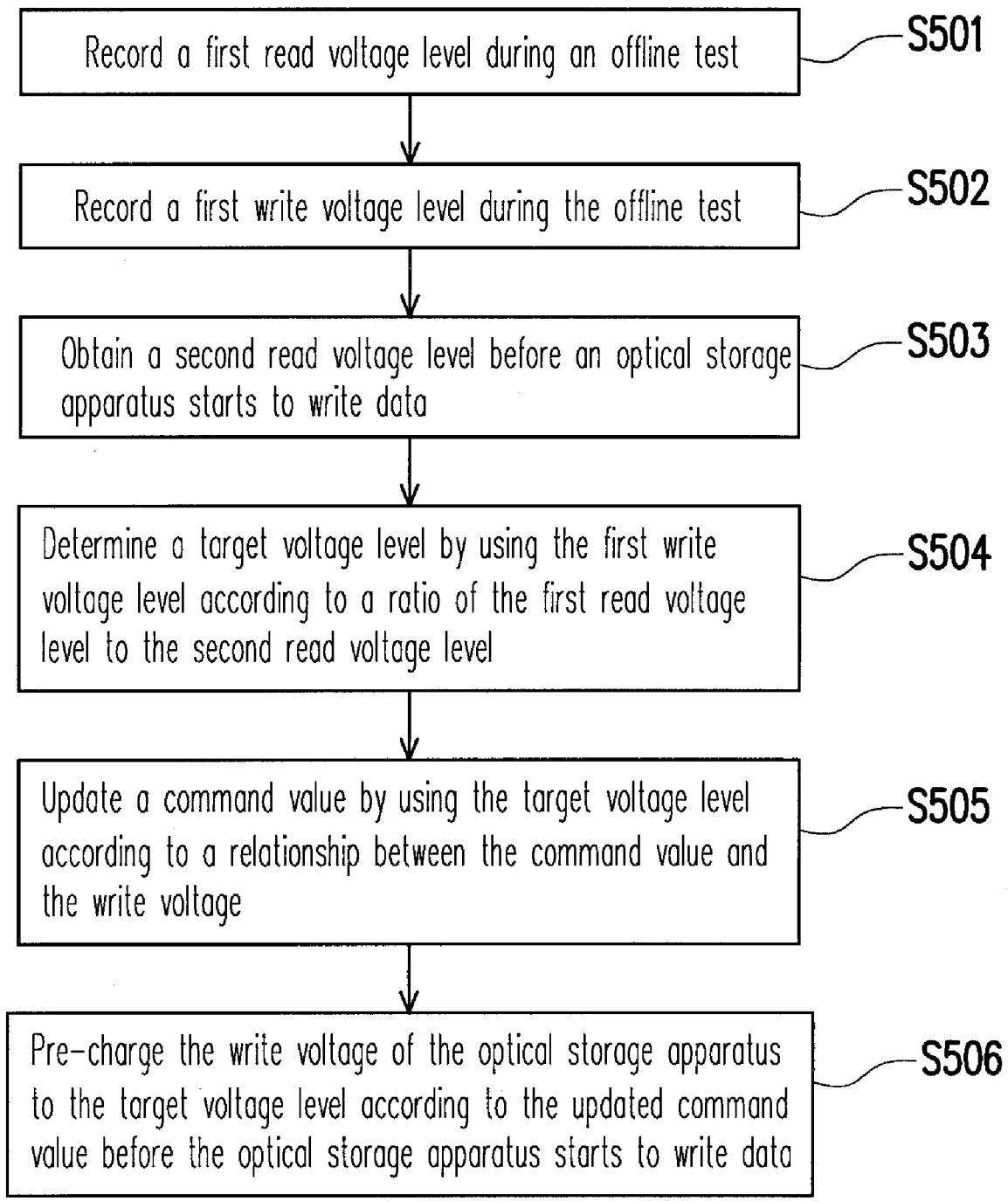
FIG. 5 is a flowchart of a method for eliminating a write power transient of an optical storage apparatus according to a fourth embodiment of the present invention.

FIG. 5 is a flowchart of a method for eliminating a write power transient of an optical storage apparatus according to the fourth embodiment of the present invention. Referring to FIG. 5, in the present embodiment, first, in step S501, a first read voltage level during an offline test is recorded. Then, in step S502, a first write voltage level during the offline test is recorded. Next, in step S503, a second read voltage level is obtained before the optical storage apparatus starts to write data. After that, in step S504, the target voltage level is determined by using the first write voltage level according to the ratio of the first read voltage level to the second read voltage level. Next, in step S505, a command value is updated by using the target voltage level according to the relationship between the command value and the write voltage. Finally, in step S506, the write voltage of the optical storage apparatus is pre-charged to the target voltage level according to the updated command value before the optical storage apparatus starts to write data.

For example, a user usually wants a DVD/VCD player to start recording once the user presses down a "record" button of the DVD/VCD player. Aforementioned OPC can precisely calibrate the write power of the optical storage apparatus, but the calibration work will take some time (for example, 4 seconds). However, there is no enough time for performing the OPC while recording data. Thus, the target voltage has to be determined by using the read voltage level (for example, 1V) and the write voltage level (for example, 1.5V) recorded during the offline test carried out by the manufacturer. When the DVD/VCD player is about to write data, it obtains the current read voltage level (for example, 1.1V) first and then multiples the previously recorded write voltage level (for example, 1.5V) by the ratio of two read voltage levels to obtain the current target voltage level (for example, 1.65 V). The command value (for example, 550) is updated according to the ratio of the command value to the write voltage so that the write voltage can be pre-charged to the target voltage level (for example, 1.65V) before the optical storage apparatus starts to write data, so as to eliminate the transient. Thereby, the target voltage level can be estimated instantly.

In another embodiment of the present invention, the target voltage level is determined by using the ratio of the temperature at the writing termination to the temperature before the optical storage apparatus starts to write data again. Namely, in step S501, only the first temperature during the offline test is recorded, in step S503, only the second temperature before the optical storage apparatus starts to write data is obtained, and in step S504, the target voltage level is determined by using the first write voltage level according to the ratio of the first temperature to the second temperature. In addition, the ratio of the temperatures and the read voltage levels can be weighted, and the target voltage level can be determined according to the weighted ratios.

As described above, the present invention provides an optical storage apparatus and a method for eliminating a write power transient thereof, wherein the target voltage level may be determined when an OPC is performed, or the target voltage level may also be determined by using the ratio of a read voltage level (or temperature) at a writing termination to a current read voltage level (or temperature), or the target voltage level may also be determined by using a ratio of a read voltage level (or temperature) during an offline test to a current read voltage level (or temperature). After the target voltage level is obtained, a command value is updated according to the target voltage level so that the write voltage can be pre-charged to the target voltage level before the optical storage apparatus starts to write data. Thereby, the target voltage level can be estimated instantly, and the write power transient before the optical storage apparatus starts to write data can be eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for eliminating a write power transient of an optical storage apparatus; comprising:
   obtaining a target voltage level of a write voltage when next time the optical storage apparatus writes data;
   updating a second command value by using the target voltage level according to a relationship between a first command value or the second command value and the write voltage; and
   pre-charging the write voltage of the optical storage apparatus to the target voltage level according to the updated second command value before the optical storage apparatus starts to write data, wherein the step of obtaining the target voltage level of the write voltage when next time the optical storage apparatus writes data comprises;
   recording a first read voltage level (VRDC) at a writing termination;
   recording a first write voltage level at the writing termination;
   obtaining a second read voltage level before the optical storage apparatus starts to write data; and
   determining the target voltage level by using the first write voltage level according to a ratio of the first read voltage level to the second read voltage level.

2. The method according to claim 1, wherein the step of obtaining the target voltage level of the write voltage when next time the optical storage apparatus writes data comprises:
   writing data into a specific area of an optical disc with a plurality of different write powers;
   reading the specific area of the optical disc; and
   determining a target write power according to the read result of the specific area, wherein a write voltage level corresponding to the target write power is served as the target voltage level.

3. The method according to claim 2, wherein the target write power is the write power corresponding to the specific area having an optimal writing quality.

4. The method according to claim 1, wherein the writing termination is a last writing termination before the optical storage apparatus starts to write data, and the writing termination is caused by insufficient data in a buffer or by a system instruction.

5. The method according to claim 1, wherein the relationship between the command value and the write voltage is a ratio of a voltage level of the write voltage measured when the optical storage apparatus performs an offline test or when the optical storage apparatus is powered on and performs a self correction to the command value.

6. A method for eliminating a write power transient of an optical storage apparatus; comprising:
   obtaining a target voltage level of a write voltage when next time the optical storage apparatus writes data;
   updating a second command value by using the target voltage level according to a relationship between a first command value or the second command value and the write voltage; and
   pre-charging the write voltage of the optical storage apparatus to the target voltage level according to the updated second command value before the optical storage apparatus starts to write data, wherein the step of obtaining the target voltage level of the write voltage when next time the optical storage apparatus writes data comprises:
   recording a first read voltage level during an offline test;
   recording a first write voltage level during the offline test;
   obtaining a second read voltage level before the optical storage apparatus starts to write data; and
   determining the target voltage level by using the first write voltage level according to a ratio of the first read voltage level to the second read voltage level.

7. The method according to claim 6, wherein the step of obtaining the target voltage level of the write voltage when next time the optical storage apparatus writes data comprises:
   writing data into a specific area of an optical disc with a plurality of different write powers;
   reading the specific area of the optical disc; and
   determining a target write power according to the read result of the specific area, wherein a write voltage level corresponding to the target write power is served as the target voltage level.

8. The method according to claim 7, wherein the target write power is the write power corresponding to the specific area having an optimal writing quality.

9. The method according to claim 6, wherein the relationship between the command value and the write voltage is a ratio of a voltage level of the write voltage measured when the optical storage apparatus performs an offline test or when the optical storage apparatus is powered on and performs a self correction to the command value.

10. A method for eliminating a write power transient of an optical storage apparatus; comprising:
    obtaining a target voltage level of a write voltage when next time the optical storage apparatus writes data;
    updating a second command value by using the target voltage level according to a relationship between a first command value or the second command value and the write voltage; and
    pre-charging the write voltage of the optical storage apparatus to the target voltage level according to the updated second command value before the optical storage apparatus starts to write data, wherein the step of obtaining the target voltage level of the write voltage when next time the optical storage apparatus writes data comprises:
    recording a first temperature at a writing termination;
    recording a first write voltage level at the writing termination;
    obtaining a second temperature before the optical storage apparatus starts to write data; and
    determining the target voltage level by using the first write voltage level according to a ratio of the first temperature to the second temperature.

11. The method according to claim 10, wherein the step of obtaining the target voltage level of the write voltage when next time the optical storage apparatus writes data comprises:
    writing data into a specific area of an optical disc with a plurality of different write powers;
    reading the specific area of the optical disc; and determining a target write power according to the read result of the specific area, wherein a write voltage level corresponding to the target write power is served as the target voltage level.

12. The method according to claim 11, wherein the target write power is the write power corresponding to the specific area having an optimal writing quality.

13. The method according to claim 10, wherein the relationship between the command value and the write voltage is a ratio of a voltage level of the write voltage measured when the optical storage apparatus performs an offline test or when the optical storage apparatus is powered on and performs a self correction to the command value.

14. A method for eliminating a write power transient of an optical storage apparatus; comprising:
    obtaining a target voltage level of a write voltage when next time the optical storage apparatus writes data;
    updating a second command value by using the target voltage level according to a relationship between a first command value or the second command value and the write voltage; and
    pre-charging the write voltage of the optical storage apparatus to the target voltage level according to the updated second command value before the optical storage apparatus starts to write data, wherein the step of obtaining the target voltage level of the write voltage when next time the optical storage apparatus writes data comprises:
    recording a first temperature during an offline test;
    recording a first write voltage level during the offline test;
    obtaining a second temperature before the optical storage apparatus starts to write data; and
    determining the target voltage level by using the first write voltage level according to a ratio of the first temperature to the second temperature.

15. The method according to claim 14, wherein the step of obtaining the target voltage level of the write voltage when next time the optical storage apparatus writes data comprises:
    writing data into a specific area of an optical disc with a plurality of different write powers;
    reading the specific area of the optical disc; and
    determining a target write power according to the read result of the specific area, wherein a write voltage level corresponding to the target write power is served as the target voltage level.

16. The method according to claim 15, wherein the target write power is the write power corresponding to the specific area having an optimal writing quality.

17. The method according to claim 14, wherein the relationship between the command value and the write voltage is a ratio of a voltage level of the write voltage measured when the optical storage apparatus performs an offline test or when the optical storage apparatus is powered on and performs a self correction to the command value.

* * * * *